Figure 2:
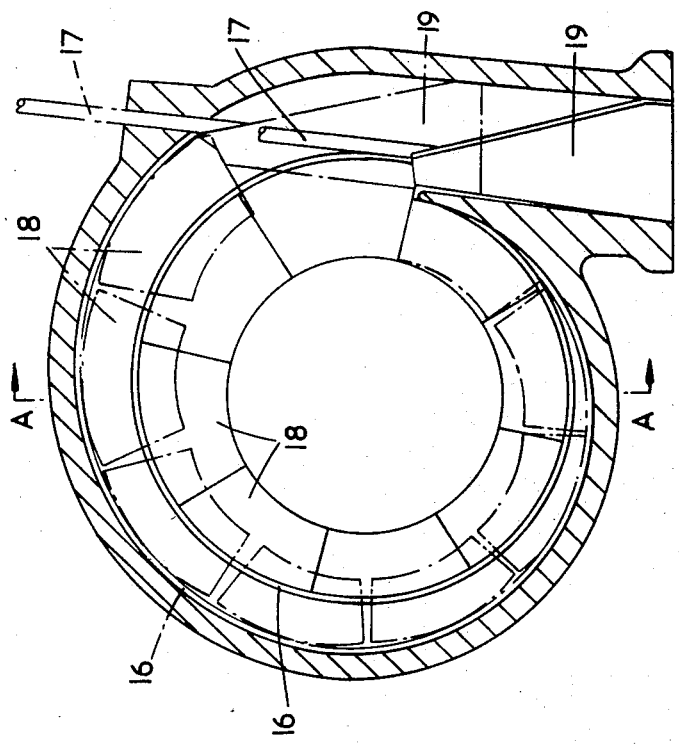

United States Patent [19]
Betteridge

[11] 3,844,676
[45] Oct. 29, 1974

[54] TURBO SUPERCHARGERS FOR INTERNAL COMBUSTION ENGINES

[75] Inventor: John Francis Betteridge, Wembley, England

[73] Assignee: C.A.V. Limited, Brimingham, England

[22] Filed: Apr. 13, 1973

[21] Appl. No.: 351,026

[30] Foreign Application Priority Data
Apr. 13, 1972 Great Britain.................. 17016/72

[52] U.S. Cl.................. 415/156, 415/148, 415/165, 415/203, 417/407
[51] Int. Cl........................................... F01b 25/02
[58] Field of Search .......... 415/147, 148, 151, 156, 415/159, 165, 203; 417/407

[56] References Cited
UNITED STATES PATENTS

| | | | |
|---|---|---|---|
| 640,345 | 1/1900 | Wilberforce........................ | 415/148 |
| 1,095,767 | 5/1914 | Adams................................ | 415/148 |
| 2,940,280 | 6/1960 | Reaser................................ | 415/156 |
| 3,149,820 | 9/1964 | Maid................................... | 415/148 |
| 3,270,495 | 9/1966 | Connor.............................. | 417/407 |
| 3,313,518 | 4/1967 | Nancarrow........................ | 415/147 |

FOREIGN PATENTS OR APPLICATIONS

| | | | |
|---|---|---|---|
| 621,254 | 5/1961 | Canada.............................. | 415/148 |
| 5,303 | 3/1912 | Great Britain..................... | 415/46 |

Primary Examiner—C. J. Husar
Attorney, Agent, or Firm—Holman & Stern

[57] ABSTRACT

A turbo super charger for an internal combustion engine includes a casing in which is formed a volute passage which diminishes in cross sectional area from an inlet and which has an opening of substantially constant width onto the periphery of the blades of a turbine. The passage accommodates a flexible band which is movable between inner and outer positions, the band supporting division members which in the inner position of the band divide the passage into two parts. The division members extend into the opening to maintain the streams of exhaust gas flowing in the two halves of the passage separated until they have inpinged upon the turbine blades.

3 Claims, 2 Drawing Figures

PATENTED OCT 29 1974

3,844,676

TURBO SUPERCHARGERS FOR INTERNAL COMBUSTION ENGINES

This invention relates to turbo superchargers for internal combustion engines and of the kind comprising a radial inward flow turbine having a casing defining a pair of engine exhaust gas inlets disposed in side by side relationship, the casing also including a volute passage having a throat and an elongated aperture through which gases entering the inlets flow onto the periphery of the turbine rotor, the supercharger also including a compressor which is driven by the turbine and which supplies air under pressure to the associated engine.

One of the problems associated with such a supercharger is the matching of the supercharger to the engine. At low engine speeds the quantity of exhaust gas is relatively small so that if the turbine is designed to operate with a low flow of exhaust gas then at increased engine speeds resulting in a much higher flow of exhaust gas, the amount of air delivered by the compressor will be excessive. Conversely if the turbine is designed to drive the compressor at the correct speed with a large flow of exhaust gas then at low engine speeds when the amount of exhaust gas is relatively small, the amount of air delivered by the compressor will be too low. Furthermore, the amount of energy in the exhaust gases at low engine speeds is comparatively low and it is desirable to preserve the pulse energy in the exhaust gases so far as is possible.

The object of the present invention is to provide a turbo supercharger in a simple and convenient form.

According to the invention a turbo supercharger of the kind specified comprises in combination, a flexible band disposed in said passage, said band extending from the end of the passage remote from said inlet towards the inlet, said band being movable to reduce the cross sectional area of the passage throughout its length, the band also serving to mount arcuate division members which when the band is set to provide the minimum cross sectional area of passage co-operate with each other to divide said passage into two parts, each part of said passage being connected to one of said inlets and the division member acting to divide said aperture so that the streams of exhaust gas flowing into said inlets are maintained separated until the exhaust gas has impinged on the turbine rotor.

Figure 1:
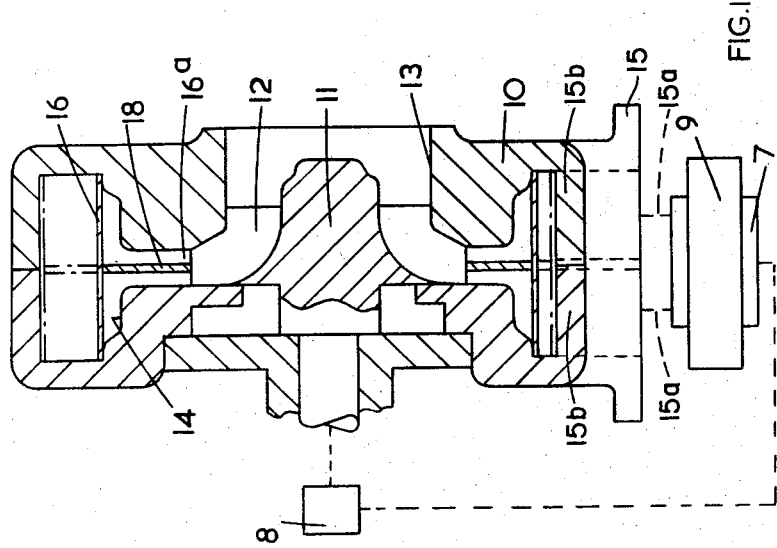

One example of a turbo supercharger in accordance with the invention will now be described with reference to the accompanying drawings in which:

FIG. 1 shows a section through the turbine portion of the supercharger taken on the line A—A of FIG. 2, together with the compressor and associated engine in block form, and FIG. 2 is an end view of the turbine casing.

A turbo supercharger for an internal combustion engine comprises a turbine to which are supplied exhaust gases from the engine 9 with which the supercharger is associated. The turbine drives a compressor 8 and the compressor supplies air under pressure to the air inlet manifold 7 of the engine.

The turbine comprises a casing 10 of generally annular form and located within the casing is the turbine rotor 11 which has blades 12. The rotor is of the radial inward flow type and the casing defines an axially extending outlet 13.

Formed within the casing is a volute passage 14 which extends from a pair of exhaust gas inlets 15b formed in an inlet flange 15, around the rotor, the passage having a reducing cross sectional area as its distance from the inlet flange increases. The passage is connected throughout its length to an aperture 16a extending about the periphery of the rotor 11 and the axial width of the aperture is substantially equal throughout its length.

The flange 15 in use, is connected to a similar flange so that a pair of exhaust pipes 15a shown in dotted outline, communicate with the passage 14 through the gas inlets 15b. The pipes lead from individual banks or groups of engine cylinders.

Mounted within the passage is a flexible band 16 and this is fixed at the outer periphery of the passage remote from the flange and extends towards the flange. For effecting movement of the band 16 there is provided an actuating member 17 and in FIG. 2 this is shown in its alternative positions. In one position of the actuating member 17 the band 16 lies against the outer peripheral wall of the passage 14 and in the other position of the operating member 17 the band 16 is moved towards the inner peripheral wall of the passage.

Mounted on the band 16 are a plurality of arcuate division members 18 and these are shaped so that when the band 16 is moved to its innermost position to restrict the area of the passage 14, the division members form a continuous division as indicated in solid outline in FIG. 2. As will be seen in FIG. 1 the division effectively divides the passage 14 into two halves and the division members extend inwardly to the aperture 16a so that gases flowing through the halves of the passage 14 will be maintained in a separated condition until they have impinged upon the blades 12 of the turbine rotor.

At its end adjacent the inlet the band mounts a division plate 19 which is of substantially triangular form and which is arranged when the band is in its contracted condition as shown in dotted outline, to extend into the inlet of the passage 14 so as to ensure separation of the exhaust gases issuing from the two exhaust gas inlets 15b before the gases flow into the passage 14. The movement of the operating member 17 also effects a variation in the size of the throat defined within the passage 14 and it will be noted that when the band is in its contracted position, the size of the throat is very much reduced as compared with its size when the band 16 lies adjacent the outer peripheral wall of the passage 14.

The division members 18 may be secured to the band in any convenient manner and when the band 16 is in the contracted condition the division members 18 act to strengthen the band to minimise the possibility of its distortion by the pulsed nature of the exhaust gases flowing into the halves of the passage 14.

Conveniently, the band 16 in its contracted condition, engages ledges defined in the passage and furthermore, the shape of the passage towards its narrower end is shaped as shown in FIG. 1.

I claim:

1. A turbo supercharger for an internal combustion engine and of the kind comprising a radial inward flow turbine having a casing defining a pair of engine exhaust gas inlets disposed in side by side relationship, the casing also including a volute passage having a throat and an elongated aperture through which gases entering the inlets flow onto the periphery of the turbine rotor, the supercharger also including a compressor which is driven by the turbine and which supplies air under pressure to the associated engine, and a flexible band disposed in said passage, said band extending from the end of the passage remote from said inlets towards the inlets, operating means coupled to the end of the band at said inlets whereby the band can be moved to reduce the cross sectional area of the passage throughout its length, arcuate division members mounted in end to end relationship on the band and which when the band is set to provide the minimum cross sectional area of passage co-operate with each other to divide said passage into two parts, each part of said passage being connected to to divide of said inlets and the division members acting todivide said aperture so that the streams of exhaust gas flowing into said inlets are maintained separated until the exhaust gas has impinged on the turbine rotor, the members when the band is moved to increase the cross sectional area of the passage separating to define spaces which place the two parts of the passage in communication with each other.

2. A turbo supercharger as claimed in claim 1 in which the end of the band remote from the inlets is secured at the outer periphery of the passage.

3. A turbo supercharger as claimed in claim 2 in which at its end adjacent the inlet the band mounts a division plate which when the band is in its contracted state extends into the inlet of the passage.

* * * * *